US007016658B2

(12) United States Patent
Kim et al.

(10) Patent No.: US 7,016,658 B2
(45) Date of Patent: Mar. 21, 2006

(54) APPARATUS AND METHOD FOR TRANSMITTING/RECEIVING DATA ACCORDING TO CHANNEL CONDITION IN A CDMA MOBILE COMMUNICATION SYSTEM WITH ANTENNA ARRAY

(75) Inventors: Sung-Jin Kim, Suwon-shi (KR); Hun-Kee Kim, Seoul (KR); Ju-Ho Lee, Suwon-shi (KR); Yong-Suk Lee, Yongin-shi (KR)

(73) Assignee: Samsung Electronics Co., Ltd., (KR)

( * ) Notice: Subject to any disclaimer, the term of this patent is extended or adjusted under 35 U.S.C. 154(b) by 579 days.

(21) Appl. No.: 10/337,711

(22) Filed: Jan. 7, 2003

(65) Prior Publication Data

US 2003/0128769 A1 Jul. 10, 2003

(30) Foreign Application Priority Data

Jan. 7, 2002 (KR) ...................... 10-2002-0000837

(51) Int. Cl.
*H04B 1/02* (2006.01)
*H04J 3/22* (2006.01)
*H03M 13/00* (2006.01)
*H04L 5/12* (2006.01)

(52) U.S. Cl. ...................... 455/102; 455/103; 455/272; 455/273; 455/277.2; 370/204; 370/465; 370/543; 714/757; 714/780; 714/810; 375/264; 375/240.27

(58) Field of Classification Search ................ 455/102, 455/103, 108, 110, 111, 115.1, 115.3, 450, 455/452.2, 504–506, 512, 513, 67.11, 69, 455/132–136, 272, 273, 275, 276.1, 277.1; 370/464–469, 479, 480, 533–544, 203, 204, 370/208, 211, 441; 714/746–768, 780, 784, 714/786, 790, 799–805, 810; 375/240.24–240.27, 375/261, 264, 265, 242, 253, 316, 324, 325, 375/340, 349

See application file for complete search history.

(56) References Cited

U.S. PATENT DOCUMENTS

| | | | | |
|---|---|---|---|---|
| 5,691,995 | A * | 11/1997 | Ikeda et al. | 714/786 |
| 6,317,462 | B1 * | 11/2001 | Boyce | 375/240.27 |
| 6,473,393 | B1 * | 10/2002 | Ariyavisitakul et al. | 370/203 |
| 6,662,024 | B1 * | 12/2003 | Walton et al. | 455/562.1 |
| 6,826,233 | B1 * | 11/2004 | Oosawa | 375/240.27 |
| 6,925,131 | B1 * | 8/2005 | Balakrishnan et al. | 375/299 |

FOREIGN PATENT DOCUMENTS

CA 2 391 905 * 3/2002

OTHER PUBLICATIONS

S. Antipolis, "Enhanced Symbol Mapping method for the modulation of Turbo-coded bits based on bit priority", 3GPP TSG RAN WG1/Wg2 Joint Meeting on HSDPA, Apr. 5-6, 2001.*

* cited by examiner

*Primary Examiner*—Duc M. Nguyen
(74) *Attorney, Agent, or Firm*—Dilworth & Barrese, LLP

(57) ABSTRACT

Disclosed is a method for providing first and second interleaved bit streams to a modulator in order to transmit the first and second interleaved bit streams through at least two antennas in a mobile communication system. An encoder encodes a transmission data stream into a first bit stream with first priority and a second bit stream with second priority being lower than the first priority. An interleaver interleaves the first and second bit streams into the first and second interleaved bit streams. The modulator modulates the first and second interleaved bit streams. The method comprises distributing the first interleaved bit stream into first assignment bit streams for the respective antennas and the second interleaved bit stream into second assignment bit streams for the respective antennas according to power condition information of the respective antennas; and generating combination bit streams by combining the first assignment bit streams and the second assignment bit streams, distributed according to the respective antennas, and providing the generated combination bit streams to the modulator.

25 Claims, 9 Drawing Sheets

APPARATUS AND METHOD FOR TRANSMITTING/RECEIVING DATA ACCORDING TO CHANNEL CONDITION IN A CDMA MOBILE COMMUNICATION SYSTEM WITH ANTENNA ARRAY

PRIORITY

This application claims priority to an application entitled "Apparatus and Method for Transmitting/Receiving Data According to Channel Condition in a CDMA Mobile Communication System with Antenna Array" filed in the Korean Industrial Property Office on Jan. 7, 2002 and assigned Serial No. 2002-837, the contents of which are incorporated herein by reference herein.

BACKGROUND OF THE INVENTION

1. Field of the Invention

The present invention relates generally to a data transmission/reception apparatus and method in a CDMA (Code Division Multiple Access) mobile communication system, and in particular, to a data transmission/reception apparatus and method suitable for high-speed data transmission requiring an adaptive modulation and coding scheme.

2. Description of the Related Art

A mobile communication system has evolved from an early voice communication system that chiefly provides a voice service into a high-speed, high-quality radio data packet communication system that provides a data service and a multimedia service. Standardizations on HSDPA (High Speed Downlink Packet Access) and 1×EV-DV (Evolution Data and Voice) are separately made by 3GPP ($3^{rd}$ Generation Partnership Project) and 3GPP2 ($3^{rd}$ Generation Partnership Project 2) in an attempt to find out a solution for a high-speed, high-quality radio data packet transmission service of 2 Mbps or over in a $3^{rd}$ generation mobile communication system. Meanwhile, a $4^{th}$ generation mobile communication system is proposed to provide a high-speed, high-quality multimedia service superior to that of the $3^{rd}$ generation mobile communication system.

In radio communications, a principal factor of impeding the high-speed, high-quality data service lies in a channel environment. The radio channel environment is frequently changed due to a variation in signal power caused by white nose and fading, shadowing, Doppler effect caused by a movement of and a frequent change in speed of a UE (User Equipment), and interference caused by other users and a multipath signal. Therefore, in order to provide the high-speed radio data packet service, there is a need for an improved technology capable of increasing adaptability to the variation in the channel environment in addition to the general technology provided for the existing $2^{nd}$ or $3^{rd}$ generation mobile communication system. A high-speed power control method used in the existing system also increases adaptability to the variation in the channel environment. However, both the 3GPP and the 3GPP2, carrying out standardization on the high-speed data packet transmission system, make reference to AMCS (Adaptive Modulation/Coding Scheme) and HARQ (Hybrid Automatic Repeat Request).

The AMCS is a technique for adaptively changing a modulation scheme (or technique) and a coding rate of a channel encoder according to a variation in the downlink channel environment. Commonly, a UE acquires channel quality information of the downlink by measuring a signal-to-noise ratio (SNR), and transmits the channel quality information of the downlink to a Node B over an uplink. The Node B predicts a channel condition of the downlink channel based on the channel quality information of the downlink, and designates a proper modulation scheme and coding rate based on the predicted value. The modulation schemes considered in the HSDPA and 1x-EVDV include QPSK (Quadrature Phase Shift Keying), 8PSK (8-ary Phase Shift Keying), 16QAM (16-ary Quadrature Amplitude Modulation) and 64QAM (64-ary Quadrature Amplitude Modulation), and the coding rates considered in the HSDPA and 1×-EVDV include ½ and ¾. Therefore, an AMCS system applies the high-order modulation schemes (16QAM and 64QAM) and the high coding rate ¾ to the UE having a good channel condition, and applies the low-order modulation schemes (QPSK and 8PSK) and the low coding rate ½ to the UE having a poor channel condition. Commonly, a UE with a good channel condition is a UE located in the vicinity of a Node B, and a UE with a poor channel condition is a UE located in a boundary of a cell. Compared with the existing high-speed power control method, the AMCS decreases an interference signal, improving average system performance.

The HARQ is a link control technique for correcting an error by retransmitting the errored data upon occurrence of a packet error at initial transmission. Generally, the HARQ is classified into Chase Combining (CC), Full Incremental Redundancy (FIR), and Partial Incremental Redundancy (PIR). The CC is a technique for transmitting a packet such that the whole packet transmitted at retransmission is equal to the packet transmitted at initial transmission. In this technique, a receiver combines the retransmitted packet with the initially transmitted packet. By doing so, it is possible to increase reliability of coded bits input to a decoder, thus resulting in an increase in the entire system performance. Combining the two same packets is similar to repeated coding in terms of effects, so it is possible to increase a performance gain by about 3 dB on the average. The FIR is a technique for transmitting a packet comprised of only the parity bits generated from the channel encoder instead of the same packet, thus to improve a coding gain of a decoder in the receiver. That is, the decoder uses the new parity bits as well as the initially transmitted information during decoding, resulting in an increase in the coding gain. The increase in the coding gain improves performance of the decoder. It is well known in a coding theory that a performance gain by a low coding rate is higher than a performance gain by repeated coding. Therefore, the FIR is superior to the CC in terms of only the performance gain. Unlike the FIR, the PIR is a technique for transmitting a combined data packet of systematic bits and new parity bits at retransmission. The PIR obtains the similar effect to the CC by combining the retransmitted systematic bits with the initially transmitted systematic bits during decoding. Further, the PIR obtains the similar effect even to the FIR by performing decoding using the parity bits. The PIR has a coding rate slightly higher than that of the FIR, showing medium performance between the FIR and the CC. However, the HARQ should be considered in the light of not only the performance but also the system complexity such as a buffer size and signaling of the receiver, so it is not easy to determine which HARQ technique best applies.

The AMCS and the HARQ are separate techniques for increasing adaptability to the variation in the link environment. However, it is possible to greatly improve the system performance by combining the two techniques. That is, if a modulation scheme and a coding rate proper for a downlink channel condition by the AMCS, then data packets corresponding thereto are transmitted.

FIG. 1 illustrates a structure of a conventional transmitter for high-speed packet data transmission. Referring to FIG. 1, a channel encoder 10 can realize AMCS and HARQ under the control of a controller 18. The channel encoder 10 is comprised of an encoder and a puncturer. If data proper to a data rate is applied to an input terminal of the channel encoder 10, the encoder performs encoding and provides the coded bits to a channel interleaver 14, in order to reduce a transmission error rate. The channel interleaver 14, a device for coping with a fading channel, separates bits constituting particular information (e.g., one word of a voice signal) from one another as far as possible, thereby decreasing a probability that the information will be lost at the same time. The interleaved signal is modulated into a symbol by a modulator 16 before being transmitted. A receiver then performs error decision on a received packet and informs the transmitter of the error decision result. If there is no error, the transmitter transmits a new packet. Otherwise, if there is an error, the transmitter retransmits the previously transmitted data. For the retransmission, the transmitter may transmit the same transmission data as initially transmitted data according to the CC of the HARQ, or transmit new channel-coded data according to the FIR or PIR of the HARQ. In the next generation mobile communication system, a more powerful coding technique is required for reliable transmission of high-speed multimedia data. A turbo encoder is a typical example of the channel encoder 10. It is known that a channel coding technique using the turbo encoder shows performance most approximative to the Shannon limit in light of a bit error rate (BER) even at a low SNR. This channel coding technique is adopted for the HSDPA and the 1xEV-DV by the 3GPP and the 3GPP2.

An output of the turbo encoder can be divided into systematic bits and parity bits. The systematic bits mean actual data to be transmitted, and the parity bits mean a parity signal added to correct an error generated during transmission at the receiver. Though not illustrated in FIG. 1, the channel encoder 10 includes a puncturer in a CDMA mobile communication system. The puncturer selectively punctures the systematic bits or parity bits among the output of the channel encoder 10, thereby satisfying the determined coding rate and demodulation order.

An operation of the channel encoder 10 will be described in detail. An input signal applied to the channel encoder 10 is output as a stream X of systematic bits. A first internal encoder of the channel encoder 10 encodes the input signal, and outputs two different streams Y1 and Y2 of parity bits. The input signal is also provided to an internal interleaver of the channel encoder 10. A signal interleaved by the internal interleaver is output as a stream X' of interleaved systematic bits, and at the same time, provided to a second internal encoder of the channel encoder 10. The second internal encoder encodes the interleaved signal and outputs two different streams Z1 and Z2 of parity bits. The streams X and X' of systematic bits, and the streams Y1, Y2, Z1 and Z2 of parity bits are provided to a puncturer in the channel encoder 10. The puncturer punctures the streams X and X' of interleaved systematic bits, and the different streams Y1, Y2, Z1 and Z2 of parity bits using a puncturing pattern selected by a control signal from the controller 18, thereby outputting only desired systematic bits and parity bits. The puncturing pattern used in the puncturer is provided from a puncturing pattern generator. The puncturing pattern depends upon a coding rate and the HARQ type. That is, if the HARQ type is CC, the puncturer punctures the coded bits such that the systematic bits and the parity bits have a fixed combination according to a prescribed coding rate, so the transmitter can transmit the same packet at each transmission. However, if the HARQ type is IR (Incremental Redundancy), the puncturer punctures the coded bits using a combination of the systematic bits and the parity bits at initial transmission, and determines whether to include the systematic bits at retransmission according to whether the IR is PIR or FIR. However, the puncturer may puncture the coded bits using various combinations of the systematic bits no matter whether the IR is PIR or FIR, thereby increasing the entire coding gain.

The systematic bits and the parity bits output from the channel encoder 10 are applied to the interleaver 14. The interleaver 14 interleaves coded bits comprised of the systematic bits and the parity bits. Therefore, the systematic bits and the parity bits are combined into one bit stream. The stream of the interleaved coded bits is applied to the modulator 16. The modulator 16, under the control of the controller 18, modulates the stream of coded bits by a prescribed modulation scheme and outputs modulation symbols. The modulation symbols output from the modulator 16 are distributed by a transmission antenna assigner 20 to a plurality of antennas constituting an antenna array. The distributed modulation symbols are transmitted through the associated antennas.

FIG. 2 illustrates a structure of a receiver corresponding to the transmitter described in conjunction with FIG. 1. Referring to FIG. 2, modulation symbols are received through a plurality of reception antennas constituting one antenna array, and the modulation symbols received through the associated antennas are provided to a channel estimation and antenna data classification block 48. The channel estimation and antenna data classification block 48 multiplexes the modulation symbols received through the reception antennas into one stream of modulation symbols. The stream of the modulation symbols is provided to a demodulator 50, and the demodulator 50 demodulates the stream of modulation symbols into a stream of coded bits by a modulation scheme corresponding to the modulation scheme used in the transmitter. The stream of coded bits are provided to a deinterleaver 54, and the deinterleaver 54 deinterleaves the stream of coded bits according to the interleaving pattern used in the transmitter. The stream of the deinterleaved coded bits is provided to a channel decoder 56, and the channel decoder 56 decodes the stream of the deinterleaved coded bits under the control of a controller 58 and outputs the decoded data stream as received data.

Commonly, in the case where errors occur in transmission data at a prescribed rate in a transmitter and a receiver for high-speed packet data transmission, errors generated in systematic bits exert more influence on entire performance of the mobile communication system, compared with errors generated in parity bits. Therefore, assuming that the same error rate is maintained as a whole, if the errors generated in the parity bits are larger in number than the error generated in the systematic bits, the receiver can perform decoding more accurately. That is, the systematic bits have more influence on the decoder compared with the parity bits. The reason is because the parity bits are redundant coded bits added to correct transmission errors during decoding.

The interleaver 14 in the transmitter of the conventional mobile communication system performs symbol interleaving regardless of priority (or importance) of the systematic bits and the parity bits. In other words, the conventional transmitter mixes the systematic bits and the parity bits, segments the mixed data bits according to transmission antennas of an antenna array, and transmits the segmented data bits through the associated transmission antennas. In this case, the transmission antennas have different transmission capabilities. Therefore, if a particular transmission antenna has a poor transmission capability, the systematic bits and the parity bits have a similar error rate, affecting the entire system performance. This means that the system performance becomes worse than when errors occur only in the parity bits. Therefore, there is a demand for a technique for decreasing a probability that errors will occur in systematic bits by taking into consideration a channel condition for the signals transmitted through the transmission antennas, thereby increasing the entire system performance.

Further, in a mobile communication system performing data transmission and reception using multiple antennas, in the case where transmission antennas have a similar channel condition, even though the transmission data is separated into systematic bits and parity bits before being transmitted, a performance gain may not occur. In this case, it is possible to improve system performance by assigning (or mapping) the systematic bits to the bits corresponding to positions more resistive to an error among the bits constituting a symbol and assigning the parity bits to the bits corresponding to positions relatively susceptible to an error, during modulation.

However, the above-stated techniques for improving performance of the mobile communication system have been used separately only. That is, in a mobile communication system using multiple antennas, there is not a case where a channel condition for each transmission antenna is applied using both techniques.

The conventional HARQ and AMCS techniques have contributed to an increase in entire system performance in high-speed packet communications. In addition, many attempts are still being made for an improved method. For example, there has been proposed a method for changing a level of the AMCS when a condition of a reception channel is changed during retransmission. That is, it is necessary to select an optimal transmission method according to a channel condition at initial transmission and retransmission.

In addition, there has been proposed a method for increasing a data rate by increasing the number of transmission/reception antennas used in Node Bs and UEs. In this case, since the transmission antennas have different transmission characteristics, future studies should be made into a transmission method considering the different transmission characteristics.

SUMMARY OF THE INVENTION

When a plurality of transmission/reception antennas are used for data transmission, a channel condition for each antenna is changed over time. A difference of the channel characteristic or channel condition between the antennas a diversity. As a result, for data transmission through each antenna, several transmission methods depending on the channel condition are required. As circumstances require, a transmission condition of the transmission/reception antennas may be determined such that it is possible to transmit data by simply separating the data into the systematic bits and the parity bits. However, in some cases, the transmission/reception antennas have a similar transmission condition, so it is not possible to determine priority of transmission/reception antennas. In this case, it is possible to improve the entire system performance through a method of distinguishing only priority of the bits constituting a symbol and separately mapping the systematic bits with high priority and the parity bits with low priority.

Accordingly, it is necessary to estimate cases where a transmission condition of multiple transmission/reception antennas is diversified, and design a system that can be flexibly adapted to each of the cases.

It is, therefore, an object of the present invention to provide a new data transmission/reception apparatus and method for improving entire system performance of a CDMA mobile communication system with an antenna array.

It is another object of the present invention to provide an apparatus and method for classifying transmission data according to how much the transmission data affects data reception performance, based on the fact that channels have different transmission conditions, and thereby transmitting different data through multiple transmission antennas.

It is further another object of the present invention to provide an apparatus and method for transmitting transmission data bits through antennas having different channel environments according to priority.

It is yet another object of the present invention to provide an apparatus and method for transmitting coded bits with high priority among transmission data bits through an antenna having a good channel condition.

It is still another object of the present invention to provide an apparatus and method for transmitting coded bits with low priority among transmission data bits through an antenna having a poor channel condition.

It is still another object of the present invention to provide an apparatus and method for mapping transmission data bits to positions with different reliabilities of a symbol according to priorities of the data bits, and properly distributing the mapped data bits to antennas having different channel conditions before transmission.

It is still another object of the present invention to provide a data transmission/reception apparatus and method for optimally adapting transmission data to a time-variant channel environment during modulation based on a position of data bits mapped to a symbol in a CDMA mobile communication system with an antenna array.

According to a first aspect of the present invention, there is provided a method for providing first and second interleaved bit streams to a modulator in order to transmit the first and second interleaved bit streams through at least two antennas in a mobile communication system including an encoder for encoding a transmission data stream at a given coding rate into a first bit stream with first priority and a second bit stream with second priority being lower than the first priority, an interleaver for interleaving the first and second bit streams and generating the first and second interleaved bit streams, and the modulator for modulating the first and second interleaved bit streams by a given modulation scheme. The method generates a combination of at least one of a first combination bit streams representing a combination of bits from the first interleaved bit stream, a second combination bit streams representing a combination of bits from the second interleaved bit stream, and a third combination bit streams representing a combination of bits from the first interleaved bit stream and the second interleaved bit stream according to power condition information of the respective antennas. The number of bits in each of the first, second and third combination bit streams is determined according to the modulation scheme.

According to a second aspect of the present invention, there is provided a method for providing first and second interleaved bit streams to a modulator in order to transmit the first and second interleaved bit streams through at least two antennas in a mobile communication system including an encoder for encoding a transmission data stream at a given coding rate into a first bit stream with first priority and a second bit stream with second priority being lower than the first priority, an interleaver for interleaving the first and second bit streams and generating the first and second interleaved bit streams, and the modulator for modulating the first and second interleaved bit streams by a given modulation scheme. The method comprises distributing the first interleaved bit stream into first assignment bit streams for the respective antennas and the second interleaved bit stream into second assignment bit streams for the respective antennas according to power condition information of the respective antennas; and generating combination bit streams for each antenna by combining the first assignment bit streams and the second assignment bit streams for each antenna, and providing the generated combination bit streams to the modulator.

According to a third aspect of the present invention, there is provided an apparatus for providing first and second interleaved bit streams to a modulator in order to transmit the first and second interleaved bit streams through at least two antennas in a mobile communication system including an encoder for encoding a transmission data stream at a given coding rate into a first bit stream with first priority and a second bit stream with second priority being lower than the first priority, an interleaver for interleaving the first and second bit streams and generating the first and second interleaved bit streams, and the modulator for modulating the first and second interleaved bit streams by a given modulation scheme. The apparatus comprises a distributor for distributing the first interleaved bit stream into first assignment bit streams for the respective antennas and the second interleaved bit stream into second assignment bit streams for the respective antennas according to power condition information of the respective antennas; and a multiplexer for generating combination bit streams for each respective antenna by combining the first assignment bit streams and the second assignment bit streams for each respective antenna, and providing the generated combination bit streams to the modulator.

According to a fourth aspect of the present invention, there is provided a method for separating first and second interleaved bit streams from combination bit streams in a mobile communication system including a demodulator for receiving modulated combination bit streams through at least two antennas and generating the combination bit streams by demodulating the modulated combination bit streams according to the antennas, a deinterleaver for generating first and second bit streams by deinterleaving first and second interleaved bit streams from the combination bit streams, and a decoder for decoding a data stream from the deinterleaved first bit stream with first priority and the deinterleaved second bit stream with second priority being lower than the first priority. The method comprises separating a first assignment bit stream and a second assignment bit stream from each of the combination bit streams demodulated according to the antennas based on power condition information of the respective antennas; and multiplexing the first assignment bit streams separated according to the antennas into the first interleaved bit stream and multiplexing the second assignment bit streams separated according to the antennas into the second interleaved bit stream.

According to a fifth aspect of the present invention, there is provided an apparatus for separating first and second interleaved bit streams from combination bit streams in a mobile communication system including a demodulator for receiving modulated combination bit streams through at least two antennas and generating the combination bit streams by demodulating the modulated combination bit streams according to the antennas, a deinterleaver for generating first and second bit streams by deinterleaving first and second interleaved bit streams from the combination bit streams, and a decoder for decoding a data stream from the deinterleaved first bit stream with first priority and the deinterleaved second bit stream with second priority being lower than the first priority. The apparatus comprises a demultiplexer for separating a first assignment bit stream and a second assignment bit stream from each of the combination bit streams demodulated according to the antennas based on power condition information of the respective antennas; and a multiplexer for multiplexing the first assignment bit streams separated according to the antennas into the first interleaved bit stream and multiplexing the second assignment bit streams separated according to the antennas into the second interleaved bit stream.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
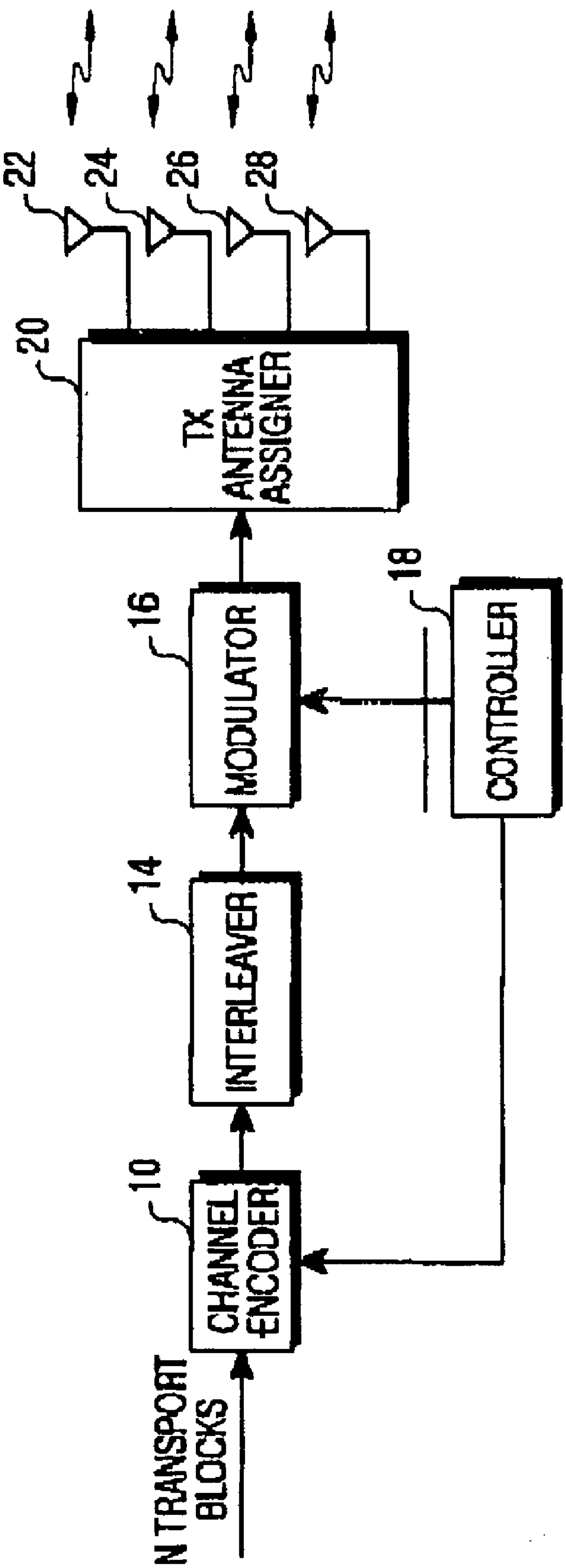
FIG. 1 illustrates a structure of a conventional transmitter in a CDMA mobile communication system with an antenna array for multi-path transmission.
Figure 2:
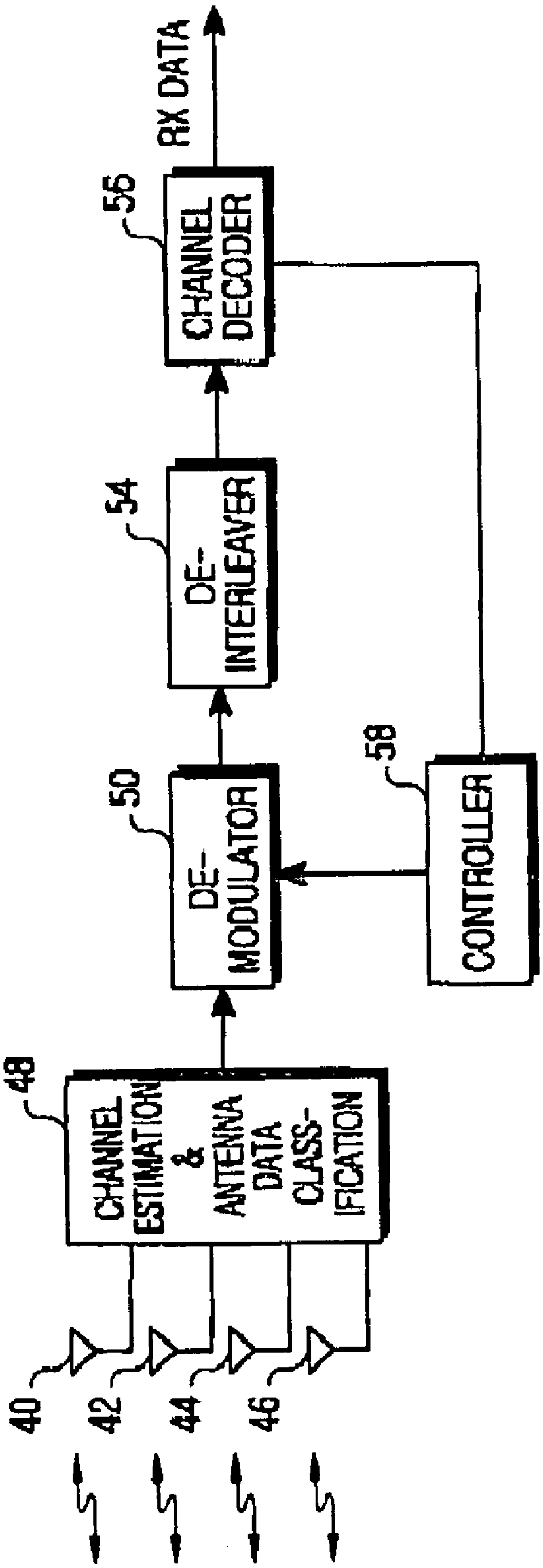
FIG. 2 illustrates a structure of a conventional receiver in a CDMA mobile communication system with an antenna array for multi-path transmission.

A preferred embodiment of the present invention will be described herein below with reference to the accompanying drawings. In the following description, well-known functions or constructions are not described in detail since they would obscure the invention in unnecessary detail.

In the following description, the present invention will provide one typical embodiment in order to achieve the technical subject stated above, and other possible embodiments will be mentioned during a description of the present invention. In the embodiment, a Node B performs channel coding on transmission data, separates data that may affect reception performance at a receiver into systematic bits and parity bits, and assigns or multiplexes the separated bits to corresponding transmission antennas. That is, the transmission data bits are assigned to the transmission antennas in such a manner that only systematic bits or parity bits among the data bits are transmitted according to a channel coding rate, a transmission condition for each transmission antenna, and a relationship between transmission conditions of the transmission antennas. Alternatively, the systematic bits are modulated together with the parity bits before being transmitted. In addition, such data transmission can be used in the same manner at initial transmission and retransmission in the HARQ. The transmission data is separated into several data groups in such a way that if a transmission data group greatly affects performance of a receiver, the transmission data is classified into data with high priority, and if a transmission data group only slightly affects performance of the receiver, the transmission data is classified into data with low priority.

Prior to a description of an embodiment of the present invention, assumptions used to realize the present invention will be summarized. Such assumptions are made for convenience of explanation, and it would be obvious to those skilled in the art that the specific values can be changed without departing from the spirit and scope of the invention.

It will be assumed that a channel encoder can operate at a coding rate of ½ and ¾, and support some or all of modulation schemes of QPSK, 8PSK, 16QAM and 64QAM. Therefore, a coding operation is divided as illustrated in Table 1.

TABLE 1

| Coding Rate | Modulation Scheme |
|---|---|
| 1/2 | QPSK |
| | 8PSK |
| | 16QAM |
| | 64QAM |
| 3/4 | QPSK |
| | 8PSK |
| | 16QAM |
| | 64QAM |

The present invention mixes two methods for improving the entire system performance, thereby providing a method that can more adaptively cope with a change in a channel condition and improve reception performance. Herein, a description will be made of a system and method that uses each of the two methods of improvement, and a system proposed by the present invention.

First Method

A first method is to distribute systematic bits and parity bits that were separated according to priority to corresponding transmission antennas based on current channel or antenna performance.

A detailed description of the first method will now be made. If a coding rate is a symmetric coding rate of ½, a channel encoder receives 1 input bit and outputs 2 coded bits. In this case, 1 bit out of the 2 coded bits is a systematic bit and the remaining 1 bit is a parity bit. If the coding rate is an asymmetric coding rate of ¾, the channel encoder receives 3 input bits and outputs 4 coded bits. The 4 coded bits are comprised of 3 systematic bits and 1 parity bit.

As stated above, the present invention is applied to a mobile communication system with multiply transmission antennas, or an antenna array, and the antenna array simultaneously transmits transmission data through several transmission antennas. In addition, the transmission antennas have different transmission conditions according to conditions of their radio channels, since the transmission signals transmitted through the transmission antennas pass through different radio channels. If two transmission antennas are used, the transmission antennas may have a channel pattern [H, L] or its reverse channel pattern. Here, "H" means that a channel condition where the data is transmitted through the transmission antenna is good, so that there is a low probability that an error will occur in the transmission data. This is defined as "good transmission condition" or "high reliability." Further, "L" means that a channel condition where the data is transmitted through the transmission antenna is poor, so that there is a high probability that an error will occur in the transmission data. This is defined as "poor transmission condition" or "low reliability." In this case, systematic bits with high priority among the coded bits are assigned (or mapped) to a transmission antenna with a good transmission condition, and parity bits with low priority are assigned to a transmission antenna with a poor transmission condition, thereby increasing system performance. An exemplary method of assigning data bits/symbols to transmission antennas according to a coding rate and a transmission condition of the transmission antennas will be described herein below.

It will be assumed that a coding rate is ½, and the number of transmission antennas is 4. When 4 transmission antennas are used, a transmission condition pattern of the transmission antennas can be determined as [H, M, M, L], [H, M, L, L], [H, L, L, L], [H, L, x, x] or [1, 2, 3, 4]. In the pattern, "M" means a medium transmission condition, "L" means a low transmission condition (poor reliability), "H" means a high transmission condition (high reliability), and "x" represents a bad transmission condition in which transmission is impossible. In addition, 1, 2, 3, and 4 represent a relative transmission order. No matter whether the transmission conditions are represented by H and L or 1, 2, 3 and 4, two transmission antennas with a good transmission condition transmit systematic bits with high priority, and the remaining two transmission antennas transmit parity bits with low priority. If the transmission condition pattern is [H, x, x, L], the systematic bits are transmitted through transmission antennas with a transmission condition H, and the parity bits are transmitted through transmission antennas with a transmission condition L. In addition, data bits separated according to priority may undergo channel interleaving and modulation in the same way. Alternatively, the data bits may undergo channel interleaving and modulation in different ways, if a receiver previously knows the channel interleaving rule and the modulation scheme.

Next, a description will be made of a method for classifying data bits with different priorities according to transmission antenna for a coding rate of ¾.

If a coding rate is ¾, the channel encoder generates 3 systematic bits and 1 parity bit for 3 input information bits. If the 4 transmission antennas have a transmission condition pattern [H, M, M, L], the systematic bits are transmitted through transmission antennas with transmission conditions H, M and M, and the 1 parity bit is transmitted through a transmission antenna with a transmission condition L. The other description is similar to the foregoing description, and even though the number of transmission antennas is increased, it is possible to separately transmit systematic bits and parity bits according to transmission conditions of the transmission antennas.

Second Method

A second method, among two conventional methods for increasing performance of a mobile communication system at a receiver, is to perform differential symbol mapping on coded bits by a prescribed modulation scheme according to priority of the coded bits. That is, coded bits with high priority among the coded bits are mapped to bit positions with high reliability, and coded bits with low priority are mapped to bit positions with low reliability.

A detailed description of the second method will be made herein below. If a coding rate is a symmetric coding rate of ½, the channel encoder outputs 1 systematic bit and 1 parity bit. If the coding rate is an asymmetric coding rate of ¾, the channel encoder receives 3 input bits and outputs 4 coded bits. The 4 coded bits are comprised of 3 systematic bits and 1 parity bit. Meanwhile, in 16QAM, one of the modulation schemes in Table 1, one symbol can be expressed with 4 bit positions such as [H, H, L, L], and in 64QAM, one symbol can be expressed with 6 bit positions such as [H, H, M, M, L, L]. Here, “H,” “M” and “L” correspond to reliabilities determined according to positions of a plurality of bits constituting a symbol. Therefore, transmission data bits with high priority are mapped to bit positions with high reliability, and transmission data bits with low priority are mapped to bit positions with low reliability, thereby improving entire system performance of the mobile communication system. Now, a brief description will be made of symbol mapping based on each of the coding rates ½ and ¾ and the modulation schemes of 16QAM and 64QAM.

First, when using a coding rate ½ and a modulation scheme of 16QAM, a transmitter maps 2 systematic bits to two bit positions “H” with high reliability, and maps 2 parity bits to two bit positions “L” with low reliability. In this case, it is preferable to use an interleaver with a fixed length.

Second, when using a coding rate ¾ and a modulation scheme of 16QAM, the transmitter can use either an interleaver with a fixed length or an interleaver with a variable length. When the transmitter uses an interleaver with a fixed length, an interleaver length for interleaving systematic bits is equal to an interleaver length for interleaving parity bits. However, when the transmitter uses an interleaver with a variable length, an interleaver length for interleaving systematic bits may be different from an interleaver length for interleaving parity bits.

When using an interleaver with a fixed length, the transmitter maps 2 systematic bits to 2 bit positions “H” with high reliability after interleaving, and maps the remaining 1 systematic bit and 1 parity bit to 2 bit positions “L” with low reliability after interleaving. Therefore, when a length of the interleaver is fixed, a structure for distributing the same number of coded bits to a plurality of interleavers is required. However, when using an interleaver with a variable length, the transmitter varies a length of the interleaver according to the number of input systematic bits and the number of input parity bits. That is, the transmitter maps 3 systematic bits to two “H” bit positions and one “L” bit position after interleaving, and maps 1 parity bit to the remaining one “L” bit position after interleaving.

Third, when using a coding rate ½ and a modulation scheme of 64QAM, the transmitter maps 2 systematic bits to two bit positions “H” with high reliability and the remaining 1 systematic bit to one of two bit positions “M” with medium reliability. Further, the transmitter maps 2 parity bits to two bit positions “L” with low reliability, and maps the remaining 1 parity bit to the remaining one bit position “M” with medium reliability. In this case, it is preferable to use an interleaver with a fixed length.

Fourth, when using a coding rate ¾ and a modulation scheme of 64QAM, the transmitter can use either an interleaver with a fixed length or an interleaver with a variable length. When using the interleaver with a fixed length, the transmitter determines a ratio of systematic bits to parity bits so that the systematic bits can be mapped to the bit positions with high reliability in the symbol patterns.

Combination of First Method and Second Method

The present invention provides a method for additionally increasing performance of a mobile communication system by combining the two methods stated above. When a channel condition suitable to the first method and the second method does not occur, the two methods are combined to stably increase system performance even though the channel condition is diversified.

A mobile communication system proposed by the present invention is comprised of a Node B and a UE, both including an antenna array. The mobile communication system with multiple antennas classifies transmission data into several groups according to how much they affect system performance. For example, the transmission data can be classified into an important data group and an unimportant data group. The classified transmission data is provided to different transmission antennas according to a condition of a transmission channel. First, when the transmission data is classified into a data group corresponding to transmission antennas with a good transmission condition and a data group corresponding to transmission antennas with a poor transmission condition, the transmission antennas transmit transmission data with different priorities. That is, the transmitter transmits the important data through transmission antennas with a good transmission condition, and the unimportant data through transmission antennas with a poor transmission condition. Next, in the case where transmission conditions of the transmission antennas are similar to or scarcely different from one another, when modulating a plurality of data bits into one symbol, the transmitter assigns important data bits to bit positions with high transmission reliability and unimportant data bits to bit positions with low transmission reliability.

Transmission condition patterns of a channel, for which both of the two methods can be used, become [H, M, M, L], [H, H, H, L], [H, L, L, L], [H, H, H, H] and [L, L, L, L], and as illustrated, a ratio of transmission antennas with a good transmission condition to transmission antennas with a poor transmission condition is not constant. However, in the case where all the transmission antennas have a good transmission condition or a poor transmission condition, it is not possible to improve the entire performance of the mobile communication system even though the transmission antennas separately transmit data bits with different priorities. In contrast, when the transmission antennas are separated into transmission antennas with a good transmission condition and transmission antennas with a poor transmission condition, a method of differently assigning transmission data bits according to positions of bits constituting a symbol for modulation of the data bits may not generate a gain. In this case, therefore, it is possible to improve performance of the mobile communication system by combining the method of distributing transmission data to transmission antennas with the method of distinguishably assigning data bits transmitted through a particular transmission antenna to bit positions of a symbol.

For example, if a transmission condition pattern of a channel is [H, M, M, L], first and fourth transmission antennas have transmission conditions H and L, respectively, so systematic bits are transmitted through the first transmission antenna and parity bits are transmitted through the fourth transmission antenna. In addition, since second and third transmission antennas have the same transmission condition, systematic bits are assigned to bit positions with high reliability within one symbol and parity bits are assigned to bit positions with low reliability for transmission through these antennas. This method is suitable to a coding rate ½. If a coding rate is ¾, it is possible to mix the two methods. That is, it is possible to transmit three systematic bits through first, second and third transmission antennas, and transmit a parity bit through a fourth transmission antenna. As stated above, the proposed method can be applied without restricting possible channel transmission conditions of transmission antennas, thus guaranteeing optimal performance.

When all the transmission antennas have a good transmission condition or a poor transmission condition, the present invention assigns different transmission data according to bit positions constituting a symbol during symbol generation for modulation without distributing transmission data to the transmission antennas, thereby increasing transmission efficiency. As described before, the proposed method can be applied in various ways according to a coding rate, a modulation scheme of each transmission antenna, and a transmission condition of a channel.

When a Node B transmits data in the proposed method, a UE receives a signal transmitted from the Node B, using a reception antenna array or one reception antenna. Here, a transmission condition for each transmission antenna of a transmission antenna array is measured by the Node B. Alternatively, the transmission condition is measured by the UE and then, fed back over an uplink channel set up to the Node B. The Node B determines transmission conditions of the transmission antennas based on the measured or feedback information, and also determines priorities based on the transmission conditions. The determined transmission conditions of the transmission antennas become a criterion for determining a data transmission method.

Meanwhile, in order to be provided with transmission condition information from a UE, the Node B must transmit a pilot signal so that the UE can measure transmission conditions of the individual antennas. Therefore, the Node B transmits a pilot signal to the UE over a common pilot channel along with data groups assigned to corresponding transmission antennas. The UE acquires transmission condition information of signals received through the transmission antennas, using the pilot signal. The UE transmits the acquired transmission condition information to the Node B. The Node B determines transmission conditions of the individual antennas based on the received transmission condition information, and assigns coded data bits of the next transmission frame to the transmission antennas according to their priorities or performs symbol mapping. Since the UE can determine an antenna through which bits of the next transmission frame will be received or a mapping rule by which the bits were symbol-mapped, based on the information transmitted from the UE to the Node B, the UE can decode signals received through individual antennas through demodulation and demultiplexing.

Now, a method of separating transmission data into a plurality of data groups and assigning the separated data groups to transmission antennas or assigning the data groups to different bit positions for symbol mapping will be described with reference to the accompanying drawings. Further, a description will be made of how a Node B and a UE transmit and receive data through transmission and reception antenna arrays based on transmission condition information of the individual antennas. However, in the present invention, a definition of the subject for determining transmission conditions of the transmission antennas will not be made and whether the subject feeds back transmission condition information will not be stated, because this is well described in the technique for distributing transmission data to transmission antennas according to their priorities in a MIMO (Multiple Input Multiple Output) system.

Structure and Operation of Transmitter

Figure 3:
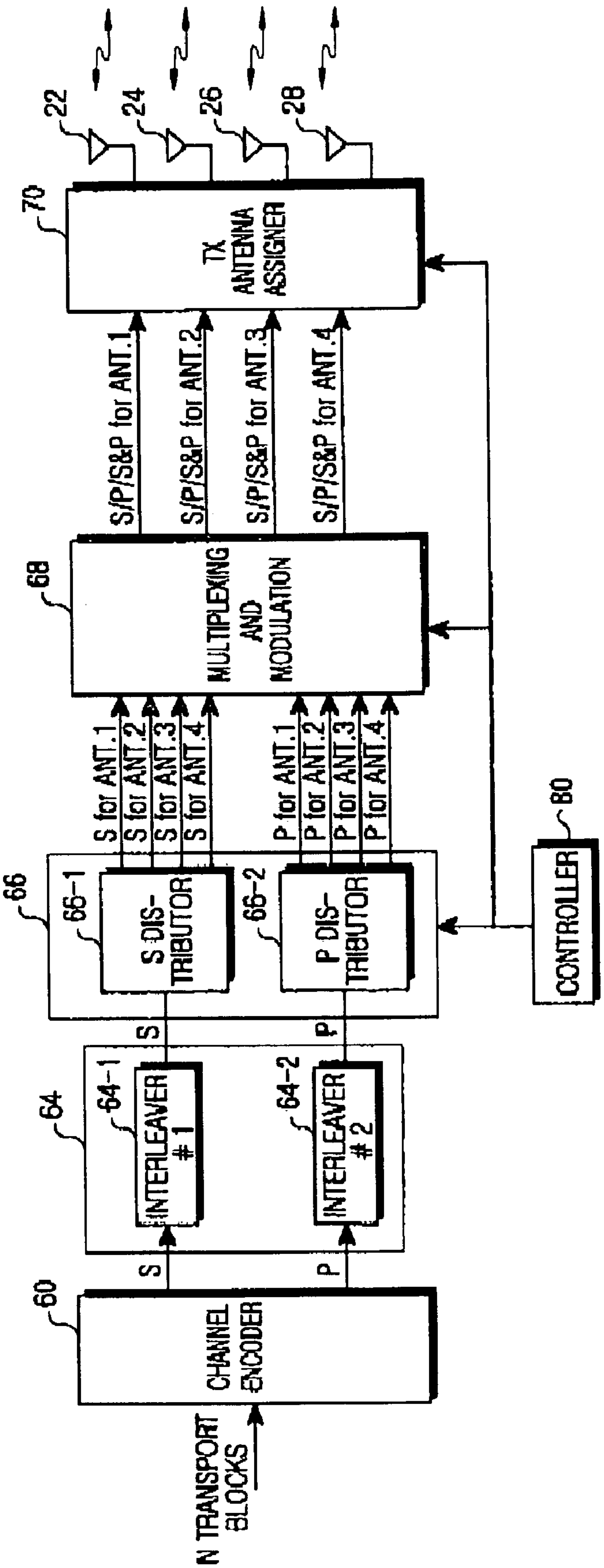
FIG. 3 illustrates a structure of a transmitter in a CDMA mobile communication system with an antenna array for multi-path transmission according to an embodiment of the present invention.

FIG. 3 illustrates a structure of a transmitter in a mobile communication system according to an embodiment of the present invention. Specifically, FIG. 3 illustrates a structure of a transmitter for transmitting input transmission data through a transmission antenna array comprised of transmission antennas 72, 74, 76 and 78 in a mobile communication system. An embodiment of the present invention will be described with reference to a typical example where a coding rate ½ and a modulation scheme of 16QAM are used for convenience of explanation among the coding rates and the modulation schemes illustrated in Table 1.

A channel encoder 60 receives data to be transmitted over a radio channel, and encodes the input data with a prescribed code thereby to generate coded bits. The "prescribed code" refers to a code for generating actual data bits to be transmitted and error control bits of the data bits by encoding the input data. For example, the coded bits are comprised of systematic bits and parity bits. The prescribed code for generating the systematic bits and parity bits includes a turbo code and a systematic convolutional code. The channel encoder 60 generates coded bits according to a coding rate, and the coding rate is determined by a controller 80. If the coding rate is ½, a ratio of systematic bits to parity bits generated by the channel encoder 60 is 1:1. That is, when 1 data bit is received, 1 systematic bit and 1 parity bit are output. Outputs of the channel encoder 60 are provided to an interleaving block 64 that provides a time diversity gain. The interleaving block 64 is comprised of a plurality of independent interleavers 64-1 and 64-2. The first interleaver 64-1 interleaves the systematic bits and the second interleaver 64-2 interleaves the parity bits. The systematic bits and parity bits interleaved by the first and second interleavers 64-1 and 64-2 are provided to a distribution block 66. The distribution block 66 is comprised of a plurality of independent distributors 66-1 and 66-2, like the interleaving block 64. The distributors 66-1 and 66-2 each distribute as many interleaved systematic bits S and parity bits P as amounts assigned to the transmission antennas, under the control of the controller 80. The total number of coded bits assigned to the transmission antennas is determined according to a coding rate and a modulation scheme of the channel encoder 60. There exist three cases where the distribution block 66 assigns the interleaved coded bits to the transmission antennas. The 3 cases include a first case where only interleaved systematic bits are distributed to a transmission antenna, a second case where only interleaved parity bits are distributed to a transmission antenna, and a third case where interleaved systematic bits and parity bits are mixedly distributed to a transmission antenna. Meanwhile, application of the 3 cases is determined according to transmission conditions of the transmission antennas. That is, the distribution block 66 distributes only the interleaved systematic bits to a transmission antenna with a good transmission condition, and distributes only the interleaved parity bits to a transmission antenna with a poor transmission condition. Further, the distribution block 66 mixedly distributes the interleaved systematic bits and parity bits to a transmission antenna with a normal transmission condition. To this end, the distributor 66-1 for distributing the interleaved systematic bits may either distribute as many systematic bits as the total number of coded bits, or a half of the total number of coded bits, to a transmission antenna, or never distribute the systematic bits to a transmission antenna. In FIG. 3, the systematic bits distributed to each antenna by the distributor 66-1 are represented by "S for Ant.#n," where "#n" is an index value designating a corresponding transmission antenna. Likewise, the distributor 66-2 for distributing the interleaved parity bits may either distribute as many parity bits as the total number of coded bits, or a half of the total number of coded bits, to a transmission antenna, or never distribute the systematic bits to a transmission antenna. In FIG. 3, the parity bits distributed to each antenna by the distributor 66-2 are represented by "P for Ant.#n," where "#n" is an index value designating a corresponding transmission antenna.

For example, if a coding rate is ½ and a modulation scheme is 16QAM, the distribution block 66 distributes the interleaved coded bits to each transmission antenna by 4 bits. The distributed 4 bits may include interleaved systematic bits, interleaved parity bits, or mixed coded bits of 2 interleaved systematic bits and 2 interleaved parity bits. More specifically, if a transmission antenna array with transmission antennas 72, 74, 76 and 78 has a transmission condition pattern [H, L, M, M], it is preferable that the first transmission antenna 72 transmits only systematic bits and the second transmission antenna 74 transmits only parity bits. Further, preferably, the third and fourth transmission antennas 76 and 78 mixedly transmit the systematic bits and the parity bits. Therefore, the distributor 66-1 distributes 4 interleaved systematic bits for "S for Ant.1," distributes no interleaved systematic bits for "S for Ant.2," and distributes 2 interleaved systematic bits for each of "S for Ant.3" and "S for Ant.4." Likewise, the distributor 66-2 distributes no interleaved parity bits for "P for Ant.1," distributes 4 interleaved parity bits for "P for Ant.2," and distributes 2 interleaved parity bits for each of "P for Ant.3" and "P for Ant.4."

Such distribution is determined by the controller 80. The controller 80 changes transmission data input to and output from the distribution block 66 according to transmission condition information of the transmission antennas 72, 74, 76 and 78, and a modulation scheme to be used for each of the transmission antennas. In the embodiment of the present invention, since a modulation scheme of all the transmission antennas 72, 74, 76 and 78 is set to 16QAM, 4 transmission data bits are assigned to each transmission antenna. In addition, since the coding rate is ½, the systematic bits and the parity bits are generated in the same ratio, so ½ of the transmission bits becomes systematic bits and the remaining ½ becomes parity bits at the transmission antenna array. The systematic bits and the parity bits for the individual transmission antennas, output from the distribution block 66, are provided to a multiplexing and modulation block 68. The multiplexing and modulation block 68 receives 8 coded bits, including systematic bits and parity bits for the individual transmission antennas received from the distribution block 66, and converts the received coded bits into output signals for 4 transmission antennas, and performs modulation on the output signals for each transmission antenna.

An operation of the distribution block 66 will be made with reference to a case where a coding rate is ½ and a modulation scheme is 16QAM. The generated systematic bits and parity bits for the transmission antennas are multiplexed by the multiplexing and modulation block 68. Here, since the first and second transmission antennas 72 and 74 each are assigned 4 bits of the systematic bits and the parity bits, if "S for Ant.1" and "P for Ant.1" are multiplexed, only 4 systematic bits are assigned to the first transmission antenna 72 and output through an output terminal S/P/S&P for Ant.1, and when "S for Ant.2" and "P for Ant.2" are multiplexed, only 4 parity bits are assigned to the second transmission antenna 74 and output through an output terminal S/P/S&P for Ant.2. The third and fourth transmission antennas 76 and 78 each are assigned 2 systematic bits and 2 parity bits, so each transmission antenna is assigned 4 mixed bits of systematic bits and parity bits. More specifically, there exist 2 systematic bits and 2 parity bits at each of "S for Ant.3" and "P for Ant.3," and when the two inputs are applied to the multiplexing and modulation block 68, the multiplexing and modulation block 68 mixes the 2 systematic bits with the 2 parity bits, and outputs 4 S&P bits to an output terminal S/P/S&P for Ant.3. Finally, like the third transmission antenna 76, the fourth transmission antenna 78 also multiplexes 2 systematic bits and 2 parity bits into one symbol, and outputs the multiplexed 4 bits to an output terminal S/P/S&P for Ant.4. Although it will be described again with reference to FIG. 6, the output data multiplexed for each transmission antenna is modulated by the multiplexing and modulation block 68 and provided to a transmission antenna assigner 70. The transmission antenna assigner 70 transmits the received transmission data bits for the transmission antennas to a UE through the transmission antenna array.

Figure 5:
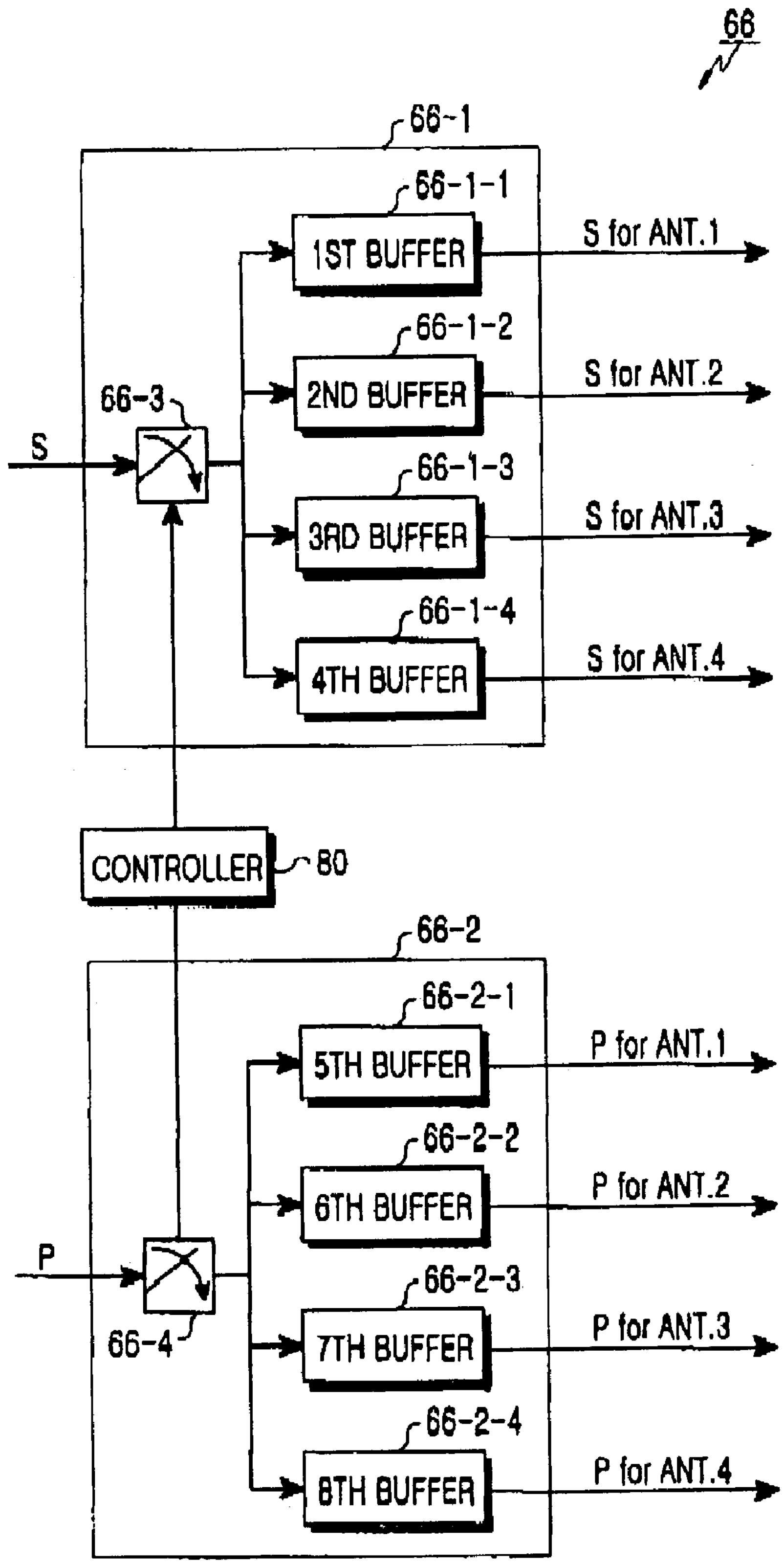
FIG. 5 illustrates a detailed structure of the distribution block illustrated in FIG. 3.

FIG. 5 illustrates a detailed structure of the distribution block 66 in the transmitter illustrated in FIG. 3. As illustrated in FIG. 5, the distribution block 66 is comprised of a first distributor 66-1 for distributing systematic bits and a second distributor 66-2 for distributing parity bits.

Referring to FIG. 5, the interleaved systematic bits S from the first interleaver 64-1 are provided to the first distributor 66-1, and the first distributor 66-1 distributes the interleaved systematic bits S according to transmission antenna. The interleaved parity bits P from the second interleaver 64-2 are provided to the second distributor 66-2, and the second distributor 66-2 distributes the interleaved parity bits P according to transmission antenna.

First, the systematic bits S provided to the first distributor 66-1 are distributed to 4 corresponding transmission antennas by a switch 66-3 under the control of the controller 80. That is, the systematic bits are distributed into systematic bits "S for Ant.1" to be transmitted through the first transmission antenna, systematic bits "S for Ant.2" to be transmitted through the second transmission antenna, systematic bits "S for Ant.3" to be transmitted through the third transmission antenna, and systematic bits "S for Ant.4" to be transmitted through the fourth transmission antenna. The systematic bits "S for Ant.1" to be transmitted through the first transmission antenna are temporarily stored in a first buffer 66-1-1, the systematic bits "S for Ant.2" to be transmitted through the second transmission antenna are temporarily stored in a second buffer 66-1-2, the systematic bits "S for Ant.3" to be transmitted through the third transmission antenna are temporarily stored in a third buffer 66-1-3, and the systematic bits "S for Ant.4" to be transmitted through the fourth transmission antenna are temporarily stored in a fourth buffer 66-1-4. The number of systematic bits stored in each of the first to fourth buffers 66-1-1 to 66-1-4 is determined according to the number of the transmission antennas, the number of the input systematic bits, and a transmission condition of each of the transmission antennas.

Next, the parity bits P provided to the second distributor 66-2 are distributed to 4 corresponding transmission antennas by a switch 66-4 under the control of the controller 80.

That is, the parity bits are distributed into parity bits "P for Ant.1" to be transmitted through the first transmission antenna, parity bits "P for Ant.2" to be transmitted through the second transmission antenna, parity bits "P for Ant.3" to be transmitted through the third transmission antenna, and parity bits "P for Ant.4" to be transmitted through the fourth transmission antenna. The parity bits "P for Ant.1" to be transmitted through the first transmission antenna are temporarily stored in a fifth buffer 66-2-1, the parity bits "P for Ant.2" to be transmitted through the second transmission antenna are temporarily stored in a sixth buffer 66-2-2, the parity bits "P for Ant.3" to be transmitted through the third transmission antenna are temporarily stored in a seventh buffer 66-2-3, and the parity bits "P for Ant.4" to be transmitted through the fourth transmission antenna are temporarily stored in an eighth buffer 66-2-4. The number of parity bits stored in each of the fifth to eighth buffers 66-2-1 to 66-2-4 is determined according to the number of the transmission antennas, the number of the input parity bits, and a transmission condition of each of the transmission antennas.

The 8 outputs are multiplexed into transmission data for corresponding transmission antennas by the multiplexing and modulation block 68 of FIG. 3, and then modulated.

Figure 7:
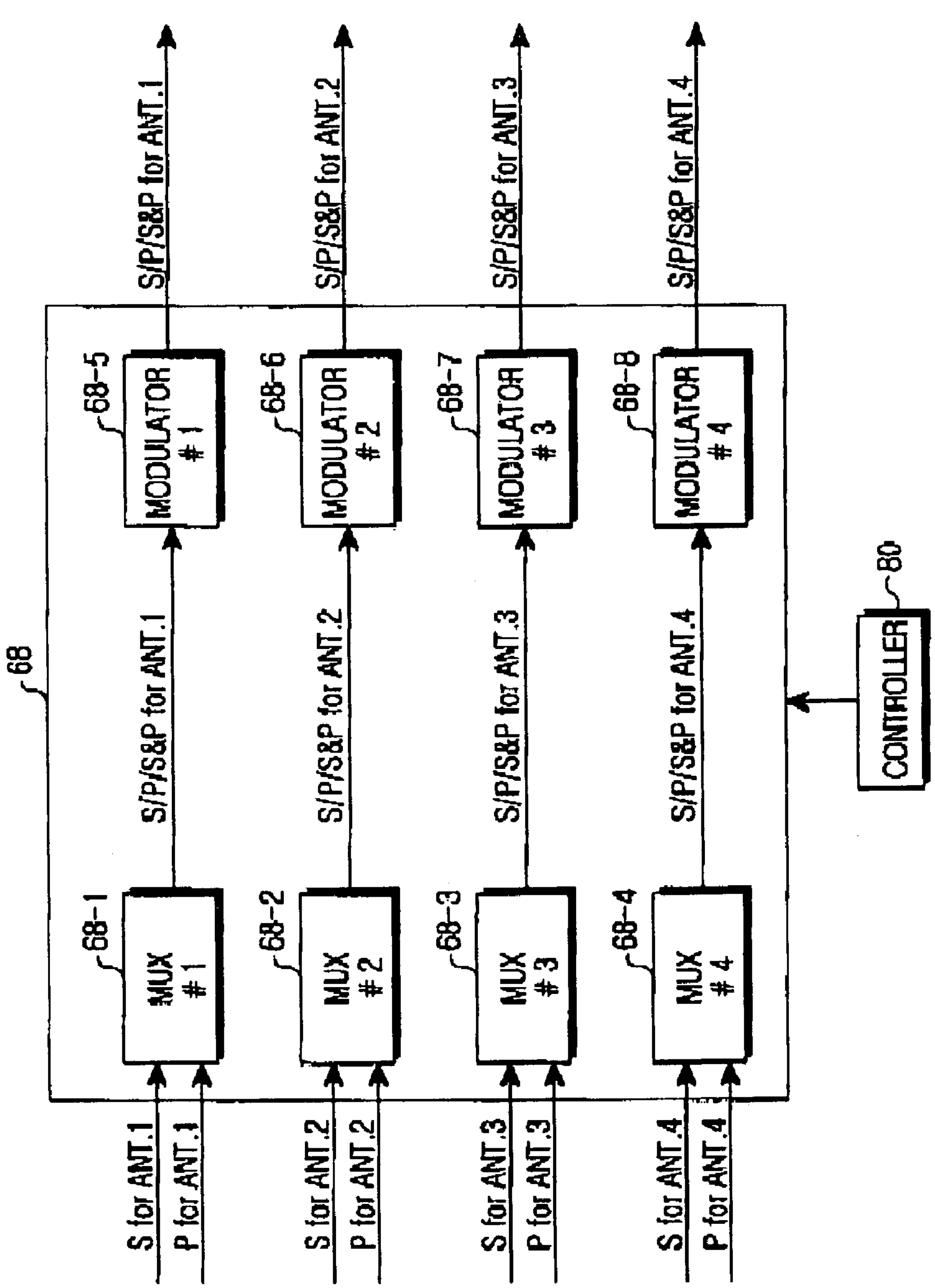
FIG. 7 illustrates a detailed structure of the multiplexing and modulation block illustrated in FIG. 3.

A detailed structure of the multiplexing and modulation block 68 is illustrated in FIG. 7. The multiplexing and modulation block 68 receives 8 data bits output from the distribution block 66 illustrated in FIG. 5. The 8 data bits are paired according to transmission antenna. In other words, a systematic bit and a parity bit corresponding to the first transmission antenna 72 are paired with each other, and other systematic bits and other parity bits corresponding to the other transmission antennas 74, 76 and 78 are also paired with each other in the same way. In some cases, the systematic bits and the parity bits may not exist in some of the 8 data input terminals, as described in conjunction with FIG. 3. Therefore, the multiplexing and modulation block 68 is comprised of a first multiplexer 68-1 for multiplexing systematic bits and parity bits to be transmitted through the first transmission antenna 72, a second multiplexer 68-2 for multiplexing systematic bits and parity bits to be transmitted through the second transmission antenna 74, a third multiplexer 68-3 for multiplexing systematic bits and parity bits to be transmitted through the third transmission antenna 76, and a fourth multiplexer 68-4 for multiplexing systematic bits and parity bits to be transmitted through the fourth transmission antenna 78. The multiplexing and modulation block 68 generates output signals S/P/S&P for Ant.1, S/P/S&P for Ant.2, S/P/S&P for Ant.3, and S/P/S&P for Ant.4 for the transmission antennas through the multiplexing, and modulates the output signals through corresponding modulators 68-5, 68-6, 68-7 and 68-8 according to a prescribed modulation scheme. Here, S/P/S&P for Ant.1, S/P/S&P for Ant.2, S/P/S&P for Ant.3, and S/P/S&P for Ant.4 represent the output bits obtained by multiplexing the systematic bits and the, parity bits.

Structure and Operation of Receiver

Figure 4:
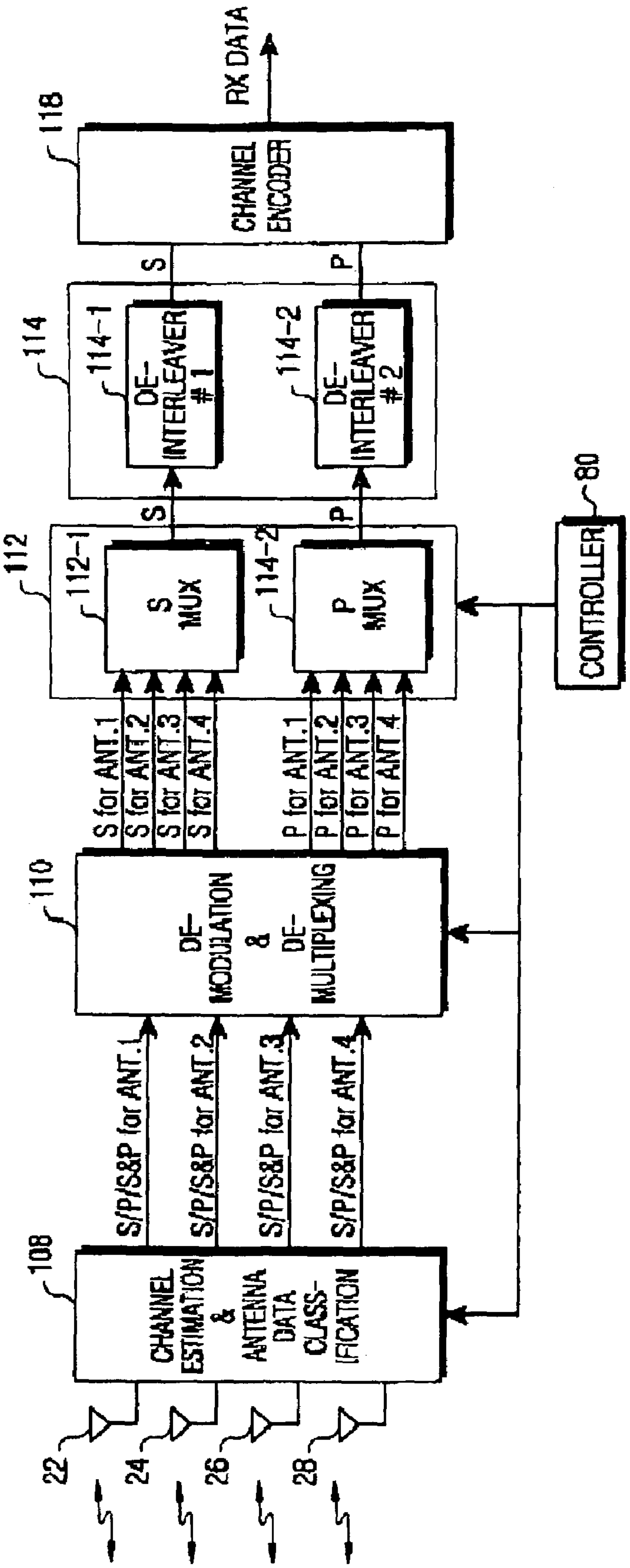
FIG. 4 illustrates a structure of a receiver in a CDMA mobile communication system with an antenna array for multi-path transmission according to an embodiment of the present invention.

FIG. 4 illustrates a structure of a receiver corresponding to the transmitter of FIG. 3 in a mobile communication system. An operation of the receiver illustrated in FIG. 4 is preformed in a reverse process of the data transmission operation by the transmitter of FIG. 3. The receiver is comprised of a reception antenna array with reception antennas 100, 102, 104 and 106, a channel estimation and antenna data classification block 108, a demodulation and demultiplexing block 110, a multiplexing block 112, a deinterleaving block 114, a channel decoder 118, and a controller 120.

Referring to FIG. 4, the data transmitted through the transmission antennas 72, 74, 76 and 78 of the transmitter is received at the receiver through the reception antennas 100, 102, 104 and 106 of the reception antenna array. The signals received at the reception antennas 100, 102, 104 and 106 are provided to the channel estimation and antenna data classification block 108, and the channel estimation and antenna data classification block 108 classifies the received signals according to transmission antenna and provides the classified signals to the demodulation and demultiplexing block 110. The demodulation and demultiplexing block 110 performs a reverse operation of the multiplexing and modulation block 68 in the transmitter. The demodulation and demultiplexing block 110 receives 4 received data groups S/P/S&P for Ant.1, S/P/S&P for Ant.2, S/P/S&P for Ant.3, and S/P/S&P for Ant.4, which were obtained by classifying the data transmitted through the transmission antennas 72, 74, 76 and 78 according to transmission antenna, demodulates the 4 received data groups for corresponding antennas, and demultiplexes each of the received data groups into systematic bits and parity bits, thus outputting 8 output signals. Here, the demodulation and demultiplexing block 110 outputs systematic bits of the received data group S/P/S&P for Ant.1 through an output terminal S for Ant.1, and outputs parity bits of the received data group S/P/S&P for Ant.1 through an output terminal P for Ant.1. The other received data groups are also output in the same way. As a result, the demodulation and demultiplexing block 110 outputs a total of 8 output signals. The 8 output signals generated from the demodulation and demultiplexing block 110 are provided to the multiplexing block 112. The multiplexing block 112 is comprised of a plurality of multiplexers 112-1 and 112-2 for separately multiplexing the systematic bits and the parity bits. The multiplexer 112-1 multiplexes 4 systematic bits S for Ant.1, S for Ant.2, S for Ant.3, and S for Ant.4, and generates an output signal comprised of only systematic bits. Further, the multiplexer 112-2 multiplexes 4 parity bits P for Ant.1, P for Ant.2, P for Ant.3, and P for Ant.4, and generates an output signal comprised of only parity bits. The systematic bits and the parity bits output from the multiplexing block 112 are provided to the deinterleaving block 114. The deinterleaving block 114 is also comprised of a plurality of deinterleavers 114-1 and 114-2 for separately deinterleaving the systematic bits and the parity bits. The deinterleavers 114-1 and 114-2 deinterleave the systematic bits and the parity bits, respectively, and provide their outputs to the channel decoder 118. The channel decoder 118 separately channel-decodes the received systematic bits and parity bits, and generates restored data.

Figure 6:
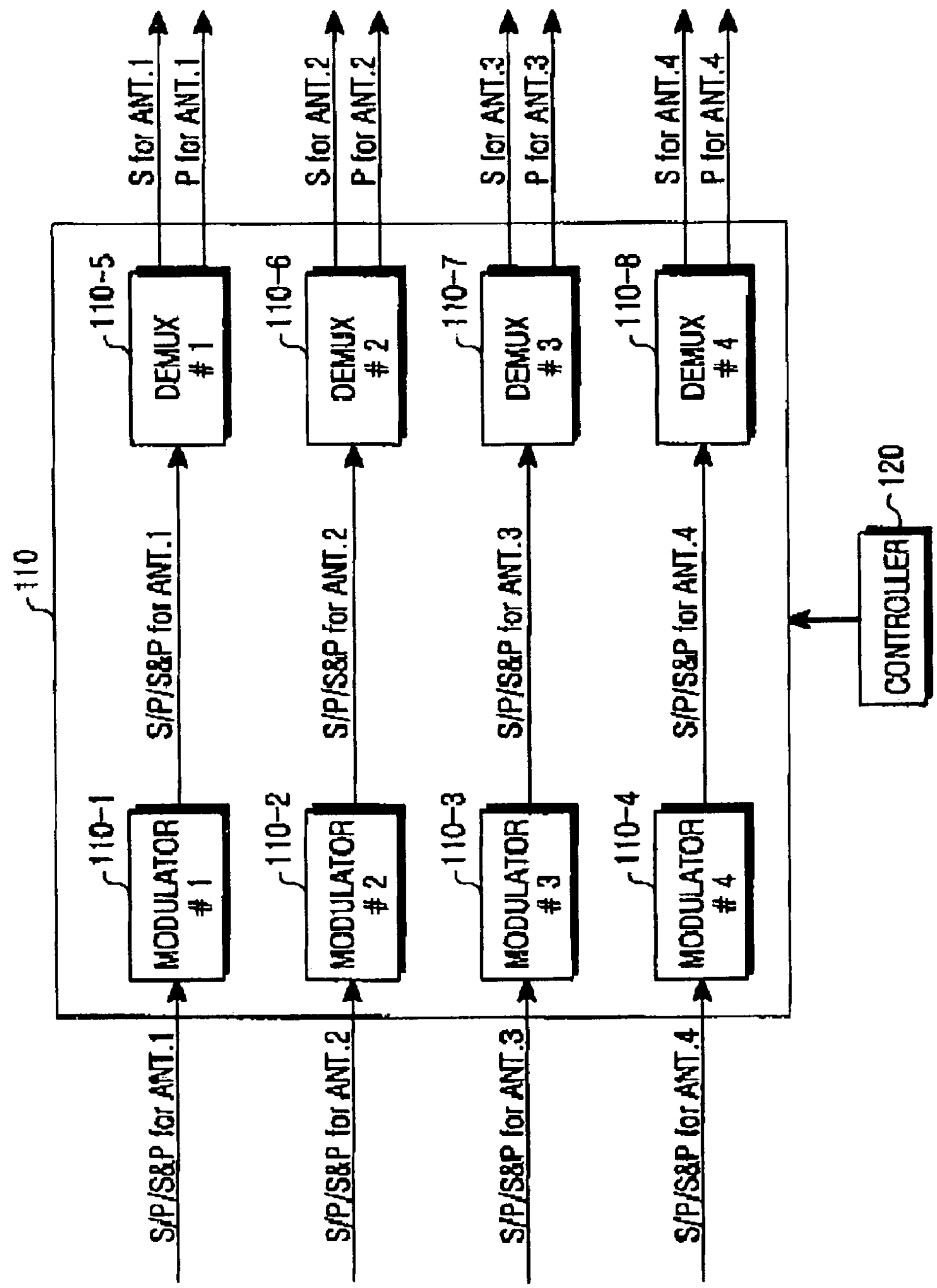
FIG. 6 illustrates a detailed structure of the demodulation and demultiplexing block in the receiver of FIG. 4.

FIG. 6 illustrates a detailed structure of the demodulation and demultiplexing block 110 in the receiver of FIG. 4. The demodulation and demultiplexing block 110 demodulates received data blocks for corresponding transmission antennas by demodulation schemes corresponding to the modulation schemes for the transmission antennas. The demodulation block has a structure corresponding to the structure of the modulation block illustrated in FIG. 7. As the modulation block includes 4 modulators 68-5, 68-6, 68-7 and 68-8, the demodulation block also includes 4 demodulators 110-1, 110-2, 110-3 and 110-4. The received data blocks S/P/S&P for Ant.1, S/P/S&P for Ant.2, S/P/S&P for Ant.3, S/P/S&P for Ant.4 demodulated by the demodulators 110-1, 110-2, 110-3 and 110-4 are provided to demultiplexers 110-5, 110-6, 110-7 and 110-8, respectively. The demultiplexers 110-5, 110-6, 110-7 and 110-8 each demultiplex the received data bocks into systematic bits and parity bits. Through the demultiplexing, the 4 received data blocks for individual transmission antennas are separated into 4 systematic bits and 4 parity bits for individual transmission antennas. A ratio of the systematic bits to the parity bits output from the demultiplexers 110-5, 110-6, 110-7 and 110-8 is determined according to transmission conditions of the corresponding transmission antennas. For example, the demultiplexers may output either only the systematic bits or only the parity bits. Further, the demultiplexers may output the systematic bits and the parity bits in a prescribed ratio. A preferred embodiment of the present invention has been described in detail with reference to FIGS. 3 to 7. The embodiment has been described even for the case where the coding rate and the modulation scheme are fixed.

In addition, the present invention provides a method of measuring channel transmission conditions for respective transmission antennas. A MIMO system using multiple antennas has 16 transmission paths between transmission antennas and reception antennas, and acquires channel characteristic information $H_{DL}$ defined as $$H_{DL} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \quad \text{Equation (1)}$$

In Equation (1), $H_{DL}$, representing a downlink channel characteristic, is measured by the channel estimation and antenna data classification block 108 of a UE (or a receiver). The measured channel information is converted into information indicating transmission conditions for the respective transmission antennas. In this case, a transmitter and a receiver of a system with an antenna array can be modeled as represented by $$Y(t)=H(t)*X(t)+N(t) \quad \text{Equation (2)}$$

Here, "*" represents convolution, $Y(t)=(y_1(t)y_2(t)\ldots y_{mR}(t))'$, $X(t)=(x_1(t)x_2(t)\ldots x_{nT}(t))'$, and N(t) is an AWGN (Additive White Gaussian Noise) vector. Herein, X(t) refers to a transmisson signal and Y(t) refers to a reception signal.

Information representing transmission conditions for the transmission antennas is generated by Water pouring. This means that the transmitter and the receiver both perceive the channel conditions. Based on the information, the transmitter can perform an operation of increasing channel capacity. This operation converts the MIMO system into a plurality of equivalent SISO (Single Input Single Output) systems through linear conversion. The present invention including transmission/reception antenna arrays converts a MIMO system into multiple SISO systems by Water pouring, and calculates transmission power of each of the transmission antennas. Further, the present invention determines a transmission condition of each transmission antenna. The determined transmission condition is used to determine a data group to be transmitted by the transmission antennas 72, 74, 76 and 78.

To this end, an SVD (Singular Value Decomposition) operation for converting a MIMO system into a plurality of SISO systems is performed as represented by $$H=UDV'' \quad \text{Equation (3)}$$

Here, U and V are singular matrixes, and D is a matrix where all components except diagonal components are 0. Since a singular matrix usually has an inverse matrix, if the transmitter and the receiver are multiplied by V and $U^H$, respectively, then a MIMO channel is separated into as many SISO channels as a smaller number between the number of the transmission antennas 72, 74, 76 and 78 and the number of reception antennas 100, 102, 104 and 106. A relationship between the transmitter and the receiver is defined as $$Y=U^H(HVX+N)\rightarrow Y+DX+U^HN \quad \text{Equation (4)}$$

Here, a diagonal component of D is a square root of an inherent value of $H^HH$. A term including a noise component N has AWGN distribution. Through this process, a plurality of SISO systems are generated, and channel capacity of a multi-antenna system becomes the sum of capacities of the SISO systems, and calculated by $$C = \sum_{k=1}^{n,m} \log_2(1+\rho_k\lambda_k) \quad \text{Equation (5)}$$

Here, $\lambda_1, \lambda_2, \ldots, \lambda_{n,m}$ are inherent values of $H^HH$, and $\rho_k$ is a level of transmission power that can be used by the transmission antennas 72, 74, 76 and 78. Further, n and m represent the number of transmission antennas 72, 74, 76 and 78, and the number of reception antennas 100, 102, 104 and 106, respectively, and as many inherent values as the smaller number out of the two numbers are generated. The transmission power level can be determined according to the generated inherent values. Transmission power assignment for maximizing channel capacity of a system with an antenna array at a particular channel is performed by Water pouring, and the Water pouring power assignment for maximizing channel capacity is defined as Equation (6)

$$P_k = \frac{1}{\lambda_0} - \frac{1}{\lambda_k}$$

Equation (6) represents a case where a condition of $\lambda_k>\lambda_0$ is satisfied, and otherwise, the power is assigned zero (0). Here, $\lambda_0$ is a value calculated by total average power restriction. The Water pouring increases channel capacity by assigning more transmission power to a channel with a good condition. A transmission condition is determined by calculating transmission power of the transmission antennas 72, 74, 76 and 78 in accordance with Equation (6), and this information is transmitted to a Node B (or a transmitter).

Such determined transmission conditions for the respective transmission antennas are used by a Node B to assign data to the transmission antennas in order to transmit the data to a UE. Further, the determined transmission conditions are used to classify data bits assigned to the bits constituting a symbol during generation of a modulation symbol.

Operation According to Embodiment

Figure 8:
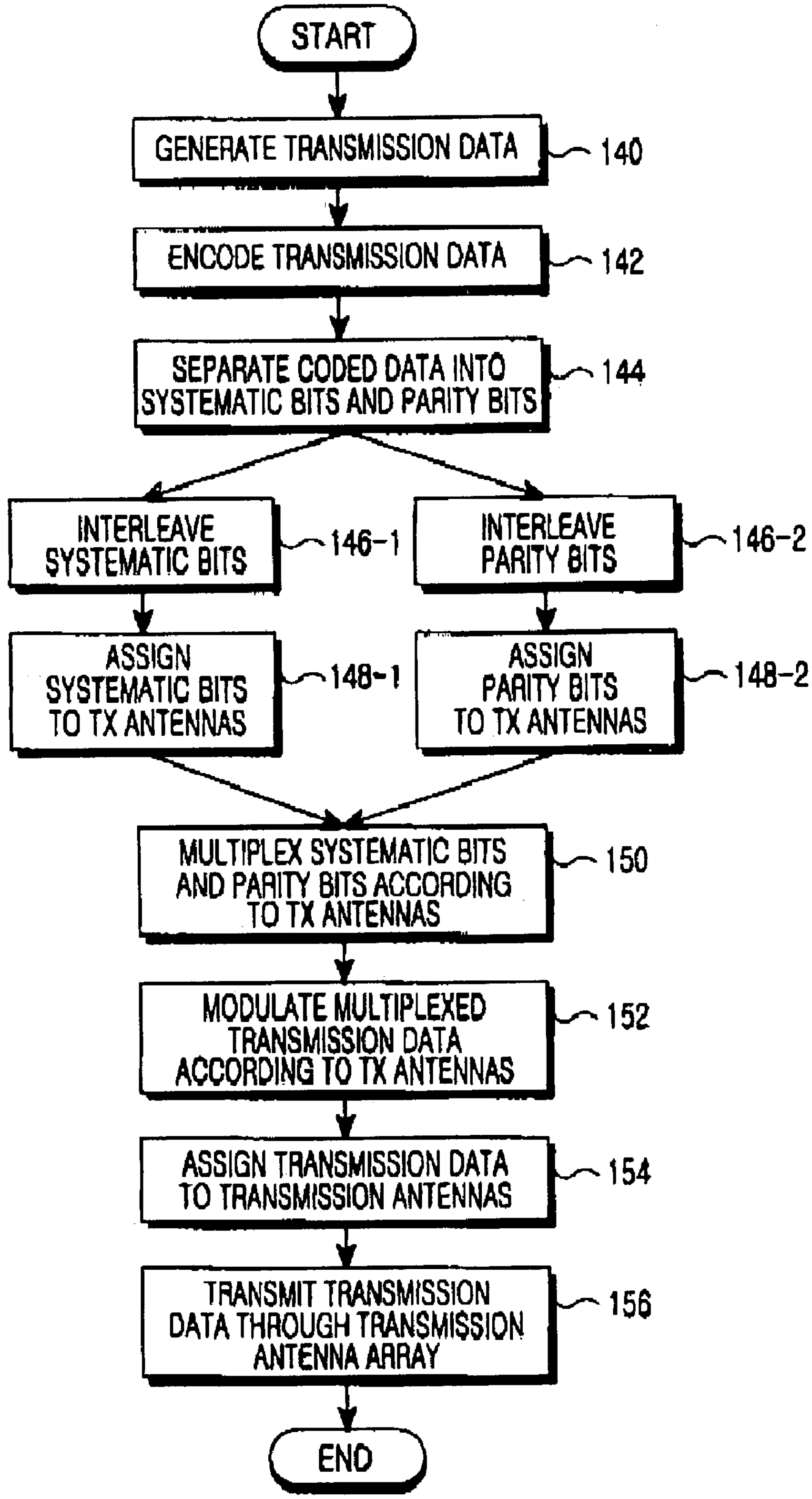
FIG. 8 illustrates a communication process performed by the transmitter according to an embodiment of the present invention.

FIG. 8 illustrates a communication process performed by the transmitter of the mobile communication system illustrated in FIG. 3. Referring to FIG. 8, when mobile communication is started, a Node B (or a transmitter) generates in step 140 transmission data to be transmitted to a UE (or a receiver). The Node B encodes in step 142 the transmission data at a prescribed coding rate by a channel encoder 60, and generates a coded data stream. The Node B separates in step 144 the coded data stream into systematic bits and parity bits having different priorities according to how much they affect performance of the receiver, and generates 2 data streams. In steps 146-1 and 146-2, the Node B channel-interleaves the 2 data streams separated in the step 144. In steps 148-1 and 148-2, the Node B separates the interleaved data streams into as many data streams as the number of the transmission antennas 72, 74, 76 and 78 under the control of a controller 80. In this way, the data streams of the systematic bits and the parity bits are separated into 4 sub-streams. Since all of the first to fourth transmission antennas 72–78 are considered when assigning the systematic bits according to the transmission antennas, the data streams are separated into 4 sub-streams. The parity bits are also separated into 4 sub-streams in the same way. The 8 sub-streams are multiplexed into 4 sub-streams according to transmission antenna. Since each transmission antenna is assigned one sub-stream for systematic bits and one sub-stream for parity bits, each transmission antenna is assigned two sub-streams. In other words, by multiplexing one sub-stream for systematic bits and one sub-stream for parity bits, one new multiplexed sub-stream, or one data stream, is generated. In this manner, the Node B generates a total of 4 data streams in step 150. After generating the 4 data streams, the Node B modulates each of the data streams in step 152, and assigns the modulated data streams to the physical transmission antennas in step 154. Thereafter, in step 156, the Node B transmits the data streams through the assigned transmission antennas, completing data transmission.

Figure 9:
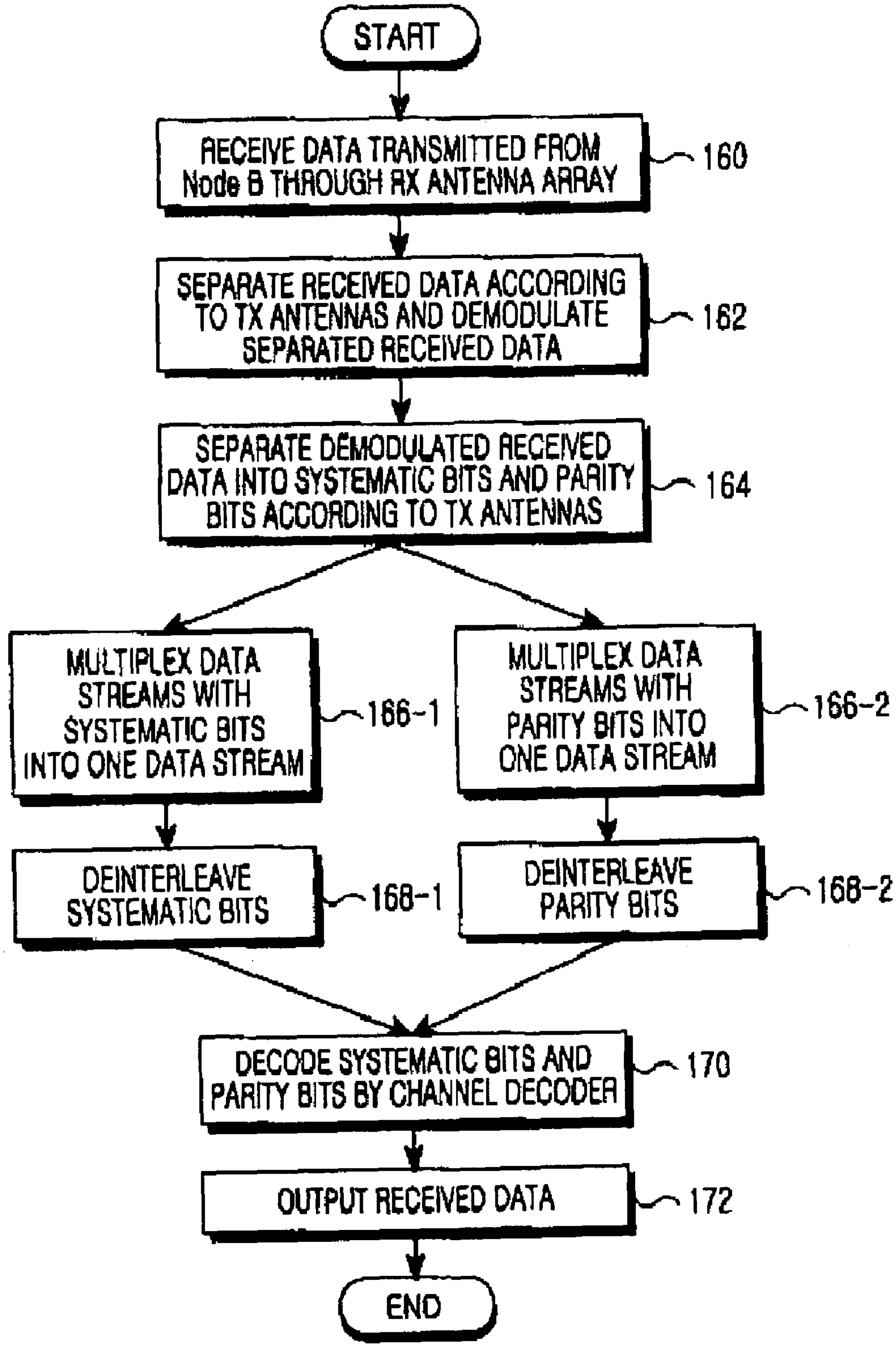
FIG. 9 illustrates a communication process performed by the receiver according to an embodiment of the present invention.

FIG. 9 illustrates a communication process performed by the receiver of the mobile communication system illustrated in FIG. 4. Referring to FIG. 9, a UE receives in step 160 a plurality of data streams transmitted from a Node B through reception antennas 100, 102, 104 and 106 of a reception antenna array. The UE separates in step 162 the received data streams into data streams for respective transmission antennas, and demodulates the separated data streams. The UE separates in step 164 each of the demodulated data streams for the respective transmission antennas into a sub-stream with systematic bits and a sub-stream with parity bits. Therefore, 4 data streams are separated into 8 sub-streams, and the sub-streams include 4 sub-streams with systematic bits and 4 sub-streams with parity bits. In steps 166-1 and 166-2, the UE multiplexes the 8 sub-streams into two data streams in such a manner that the sub-streams with the same data components are separately multiplexed, i.e., the sub-streams with the systematic bits and the sub-streams with the parity bits are separately multiplexed. The UE deinterleaves the two data streams in steps 168-1 and 168-2, and channel-decodes the systematic bits and the parity bits by a channel decoder in step 170. Thereafter, the UE outputs in step 172 the channel-decoded received data by restoring the data transmitted by the Node B, completing data reception.

As described above, the present invention provides a method applicable to a case where transmission antennas have different transmission conditions during data transmission through the transmission antennas and a case where the transmission conditions are poor so that it is difficult to improve system performance with the conventional data transmission method, in a CDMA mobile communication system with a plurality of transmission and reception antennas.

If, as mentioned before, the transmission and reception antennas all have the same transmission conditions, it is not necessary to classify data bits according to their priorities. Particularly, in this case, it is possible to improve entire performance of a mobile communication system by assigning systematic bits to the bits located in a position resistive to an error among the bits constituting a symbol and assigning parity bits to the bits located in a position susceptible to an error among the bits constituting the symbol when generating a modulation symbol. In addition, when a good transmission-condition and a poor transmission condition are always distinguishable, it is possible to transmit transmission data by separating them into only systematic bits and parity bits. It is possible to increase performance of the mobile communication system by separating transmission data into only systematic bits and parity bits and transmitting the systematic bits through a transmission antenna with a good transmission condition and the parity bits through a transmission antenna with a poor transmission condition.

The present invention provides a new method for improving entire performance of a mobile communication system not only when channel conditions between multiple transmission and reception antennas are similar to or different from one another, but also when the two cases are mixed. No matter how the channel conditions between the multiple transmission and reception antennas are determined, the proposed method can improve the entire system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for providing first and second interleaved bit streams to a modulator in order to transmit the first and second interleaved bit streams through at least two antennas in a mobile communication system including an encoder for encoding a transmission data stream at a given coding rate into a first bit stream with first priority and a second bit stream with second priority being lower than the first priority, an interleaver for interleaving the first and second bit streams and generating the first and second interleaved bit streams, and the modulator for modulating the first and second interleaved bit streams by a given modulation scheme, the method comprising the step of:

generating a combination of at least one of a first combination bit streams representing a combination of bits from the first interleaved bit stream, a second combination bit streams representing a combination of bits from the second interleaved bit stream, and a third combination bit streams representing a combination of bits from the first interleaved bit stream and the second interleaved bit stream according to power condition information of the respective antennas, wherein the number of bits in each of the first, second and third combination bit streams is determined according to the modulation scheme.

2. The method of claim 1, wherein the first combination bit stream is generated for an antenna with a good transmission condition based on the power condition information, the second combination bit stream is generated for an antenna with a poor transmission condition based on the power condition information, and the third combination bit stream is generated for an antenna with a medium transmission condition based on the power condition information.

3. The method of claim 1, wherein the number of bit streams by combination of the first combination bit streams, the second combination bit streams and the third combination bit streams is equal to the number of the antennas.

4. A method for providing first and second interleaved bit streams to a modulator in order to transmit the first and second interleaved bit streams through at least two antennas in a mobile communication system including an encoder for encoding a transmission data stream at a given coding rate into a first bit stream with first priority and a second bit stream with second priority being lower than the first priority, an interleaver for interleaving the first and second bit streams and generating the first and second interleaved bit streams, and the modulator for modulating the first and second interleaved bit streams by a given modulation scheme, the method comprising the steps of:

distributing the first interleaved bit stream into first assignment bit streams for the respective antennas and the second interleaved bit stream into second assignment bit streams for the respective antennas according to power condition information of the respective antennas; and generating combination bit streams for each respective antenna by combining the first assignment bit streams and the second assignment bit streams for each respective antenna, and providing the generated combination bit streams to the modulator.

5. The method of claim 4, wherein the number of bits in each of the combination bit streams is determined based on the modulation scheme.

6. The method of claim 4, wherein for an antenna with a good transmission condition based on the power condition information, as many first interleaved bits as the number of bits determined by the modulation scheme, are distributed from the first interleaved bit stream as the first assignment bit stream, and are not distributed as the second assignment bit stream.

7. The method of claim 6, wherein for an antenna with a poor transmission condition based on the power condition information, as many second interleaved bits as the number of bits determined by the modulation scheme, are distributed from the second interleaved bit stream as the second assignment bit stream, and are not distributed as the first assignment bit stream.

8. The method of claim 7, wherein for an antenna with a medium transmission condition based on the power condition information, the first and second assignment bit streams from the first and second interleaved bit streams are distributed according to a ratio of the coding rate.

9. The method of claim 8, wherein the modulator modulates the combination bit stream by the given modulation scheme by mapping first interleaved bits constituting the combination bit stream to bit positions with high reliability among bit positions constituting one modulation symbol, and mapping second interleaved bits constituting the combination bit stream to bit positions with low reliability among the bit positions.

10. An apparatus for providing first and second interleaved bit streams to a modulator in order to transmit the first and second interleaved bit streams through at least two antennas in a mobile communication system including an encoder for encoding a transmission data stream at a given coding rate into a first bit stream with first priority and a second bit stream with second priority being lower than the first priority, an interleaver for interleaving the first and second bit streams and generating the first and second interleaved bit streams, and the modulator for modulating the first and second interleaved bit streams by a given modulation scheme, the apparatus comprising:

a distributor for distributing the first interleaved bit stream into first assignment bit streams for the respective antennas and the second interleaved bit stream into second assignment bit streams for the respective antennas according to power condition information of the respective antennas; and a multiplexer for generating combination bit streams for each respective antenna by combining the first assignment bit streams and the second assignment bit streams for each respective antenna, and providing the generated combination bit streams to the modulator.

11. The apparatus of claim 10, wherein the number of bits in each of the combination bit streams is determined based on the modulation scheme.

12. The apparatus of claim 10, wherein for an antenna with a good transmission condition based on the power condition information, the distributor distributes as many first interleaved bits as the number of bits, determined by the modulation scheme, from the first interleaved bit stream as the first assignment bit stream and does not distribute the first interleaved bits as the second assignment bit stream.

13. The apparatus of claim 12, wherein for an antenna with a poor transmission condition based on the power condition information, the distributor distributes as many second interleaved bits as the number of bits, determined by the modulation scheme, from the second interleaved bit stream as the second assignment bit stream and does not distribute the second interleaved bits as the first assignment bit stream.

14. The apparatus of claim 13, wherein for an antenna with a medium transmission condition based on the power condition information, the distributor distributes the first and second assignment bit streams from the first and second interleaved bit streams according to a ratio of the coding rate.

15. The apparatus, of claim 14, wherein the modulator modulates the combination bit stream by the given modulation scheme by mapping first interleaved bits constituting the combination bit stream to bit positions with high reliability among bit positions constituting one modulation symbol, and mapping second interleaved bits constituting the combination bit stream to bit positions with low reliability among the bit positions.

16. A method for separating first and second interleaved bit streams from combination bit streams in a mobile communication system including a demodulator for receiving modulated combination bit streams through at least two antennas and generating the combination bit streams by demodulating the modulated combination bit streams according to the antennas, a deinterleaver for generating first and second bit streams by deinterleaving first and second interleaved bit streams from the combination bit streams, and a decoder for decoding a data stream from the deinterleaved first bit stream with first priority and the deinterleaved second bit stream with second priority being lower than the first priority, the method comprising the steps of:

separating a first assignment bit stream and a second assignment bit stream from each of the combination bit streams demodulated according to the antennas based on power condition information of the respective antennas; and multiplexing the first assignment bit streams separated according to the antennas into the first interleaved bit stream and multiplexing the second assignment bit streams separated according to the antennas into the second interleaved bit stream.

17. The method of claim 16, wherein the number of bits in each of the combination bit streams is determined based on a modulation scheme used in a transmitter.

18. The method of claim 16, wherein for an antenna with a good transmission condition based on the power condition information, the respective first assignment bit stream separated from the demodulated combination bit stream has as many first interleaved bits as the number of bits, determined by a modulation scheme used in a transmitter, and the respective second assignment bit stream does not exist.

19. The method of claim 18, wherein for an antenna with a poor transmission condition based on the power condition information, the respective second assignment bit stream separated from the demodulated combination bit stream has as many second interleaved bits as the number of bits, determined by the modulation scheme used in the transmitter, and the resepective first assignment bit stream does not exist.

20. The method of claim 19, wherein for an antenna with a medium transmission condition based on the power condition information, the first and second assignment bit streams are separated from the respective combination bit streams according to a ratio of the coding rate.

21. An apparatus for separating first and second interleaved bit streams from combination bit streams in a mobile communication system including a demodulator for receiving modulated combination bit streams through at least two antennas and generating the combination bit streams by demodulating the modulated combination bit streams according to the antennas, a deinterleaver for generating first and second bit streams by deinterleaving first and second interleaved bit streams from the combination bit streams, and a decoder for decoding a data stream from the deinterleaved first bit stream with first priority and the deinterleaved second bit stream with second priority being lower than the first priority, the apparatus comprising:

a demultiplexer for separating a first assignment bit stream and a second assignment bit stream from each of the combination bit streams demodulated according to the antennas based on power condition information of the respective antennas; and a multiplexer for multiplexing the first assignment bit streams separated according to the antennas into the first interleaved bit stream and multiplexing the second assignment bit streams separated according to the antennas into the second interleaved bit stream.

22. The apparatus of claim 21, wherein the number of bits in each of the combination bit streams is determined based on a modulation scheme used in a transmitter.

23. The apparatus of claim 21, wherein for an antenna with a good transmission condition based on the power condition information, the respective first assignment bit stream separated from the demodulated combination bit stream has as many first interleaved bits as the number of bits, determined by a modulation scheme used in a transmitter, and the respective second assignment bit stream does not exist.

24. The apparatus of claim 23, wherein for an antenna with a poor transmission condition based on the power condition information, the respective second assignment bit stream separated from the demodulated combination bit stream has as many second interleaved bits as the number of bits, determined by the modulation scheme used in the transmitter, and the respective first assignment bit stream does not exist.

25. The apparatus of claim 24, wherein for an antenna with a medium transmission condition based on the power condition information, the first and second assignment bit streams are separated from the respective combination bit streams according to a ratio of the coding rate.

* * * * *